United States Patent [19]

Moore

[11] Patent Number: 4,961,699
[45] Date of Patent: Oct. 9, 1990

[54] APPARATUS FOR FOAMING BUBBLES

[75] Inventor: R. Gilbert Moore, North Ogden, Utah

[73] Assignee: Thiokol Corporation, Ogden, Utah

[21] Appl. No.: 200,601

[22] Filed: May 31, 1988

[51] Int. Cl.$^5$ .......................... B64G 4/00; B29C 49/28
[52] U.S. Cl. .................................. 425/387.1; 52/2 E;
244/1 R; 264/500; 264/552; 264/574
[58] Field of Search ............... 264/544, 574, 500, 552;
425/387.1, 275; 446/15, 18; 244/1 R, 158 R,
159; 52/2 E

[56]  References Cited

U.S. PATENT DOCUMENTS

| | | | |
|---|---|---|---|
| 2,996,212 | 8/1961 | O'Sullivan, Jr. | 220/1 |
| 3,109,255 | 3/1963 | Hein | 446/15 |
| 3,258,598 | 6/1966 | Schalkowsky | 250/203 |
| 3,282,533 | 11/1966 | Spain | 244/1 |
| 3,534,926 | 10/1970 | Wuencher | 244/1 |
| 3,579,472 | 5/1971 | Rubens et al. | 260/2.5 |
| 3,925,923 | 12/1975 | La Fata et al. | 446/18 |
| 3,927,227 | 12/1975 | Pitts | 427/162 |
| 4,115,975 | 9/1978 | Bliss | 52/646 |
| 4,253,284 | 3/1981 | Bliss | 52/109 |
| 4,284,534 | 8/1981 | Ehrlich | 252/542 |
| 4,691,517 | 9/1987 | Banks | 60/527 |
| 4,730,797 | 3/1988 | Minovitch | 244/159 |

OTHER PUBLICATIONS

Rollins, Douglas, "A Face in the Crowd", Utah Holiday, Sep. 1981, p. 22.
Stong, C. L., "The Amateur Scientist", Scientific American, May 1969, pp. 128-133.
Stine, G. Harry, The Third Industrial Revolution, pp. 142-146.
Kuesterman, Bob, "Reserved First Getaway Special-Space Worker Also Enthusiast", The Huntsville Times, May 25, 1988.
"Discussion Meeting on Gossamer Spacecraft (Ultralightweight Spacecraft): Final Report", JPL Publication 8026, Jet Propulsion Lab, 5-15-80, pp. VII-3 and 50.
"Man Wants to Put Bubble Machine in Orbit", Houston Chronicle, Nov. 7, 1981, Sec. 1, p. 23.
Johnson et al., "P/M Processing and Characterization of Controlled Transformation Temperature NiTi", Journal de Physique, Dec. 82, p. C4-285-290.
Johnson et al., "Monotonic and Thermomechanical Testing of P/M NiTi," Journal de Physique, Dec. 82, pp. C4-291 to 296.
Battelle Memorial Institute, "The Engineering/Design Properties of NITINOL the 'Metal With a Memory'", Jun. 25, 1969.

Primary Examiner—Jan H. Silbaugh
Assistant Examiner—Catherine Timm
Attorney, Agent, or Firm—James C. Simmons; Gerald K. White; Allen H. Erickson

[57]  ABSTRACT

Apparatus and methods for thin film formation from which structures may be constructed for use in space. An elastic expandable torus is rolled upon itself about its circular axis as a bubble is formed so that the bubble attachment line may be repositioned to maintain an optimal ratio of attachment diameter to bubble diameter and to maintain an appropriate bubble contact angle and to provide a pre-wetted surface for the bubble at the bubble attachment line. Also included is a frame composed of memory metal which is compacted for immersion in thin film forming fluid and heated to its transition temperature for self erecting to a predetermined thin film shape whereby the need for pressurized gas for formation of the thin film is eliminated.

5 Claims, 4 Drawing Sheets

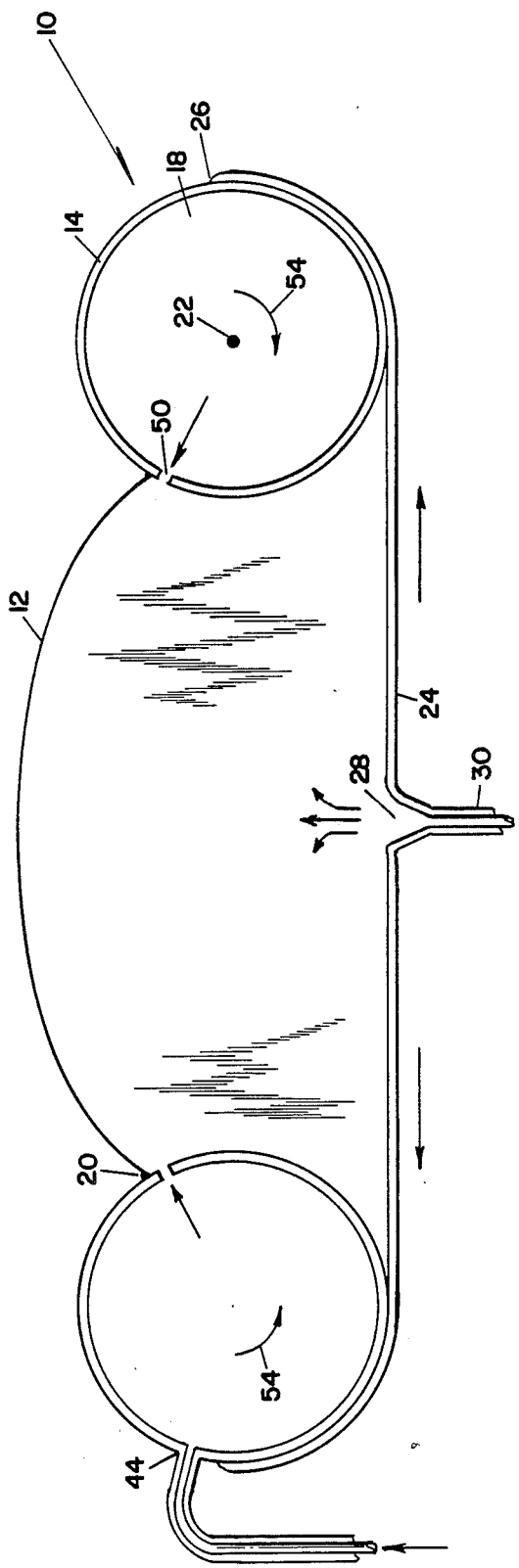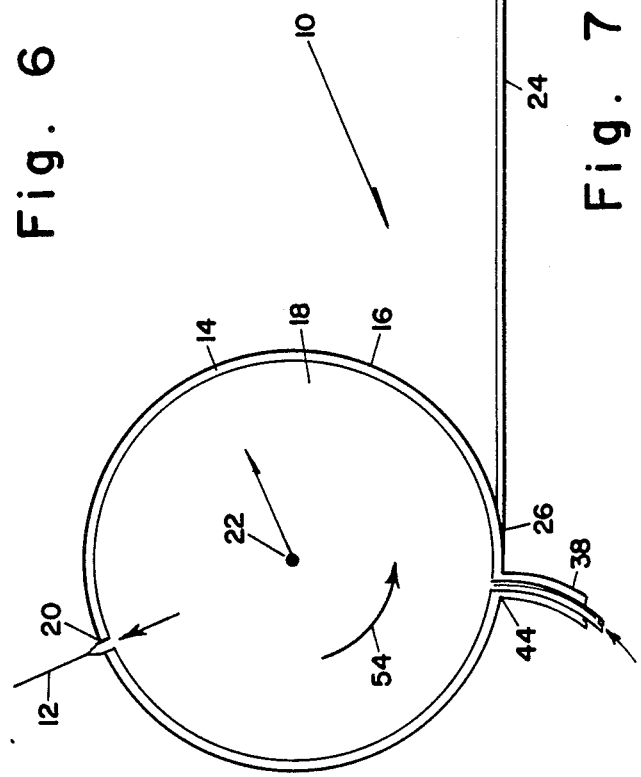
Fig. 6
Fig. 7

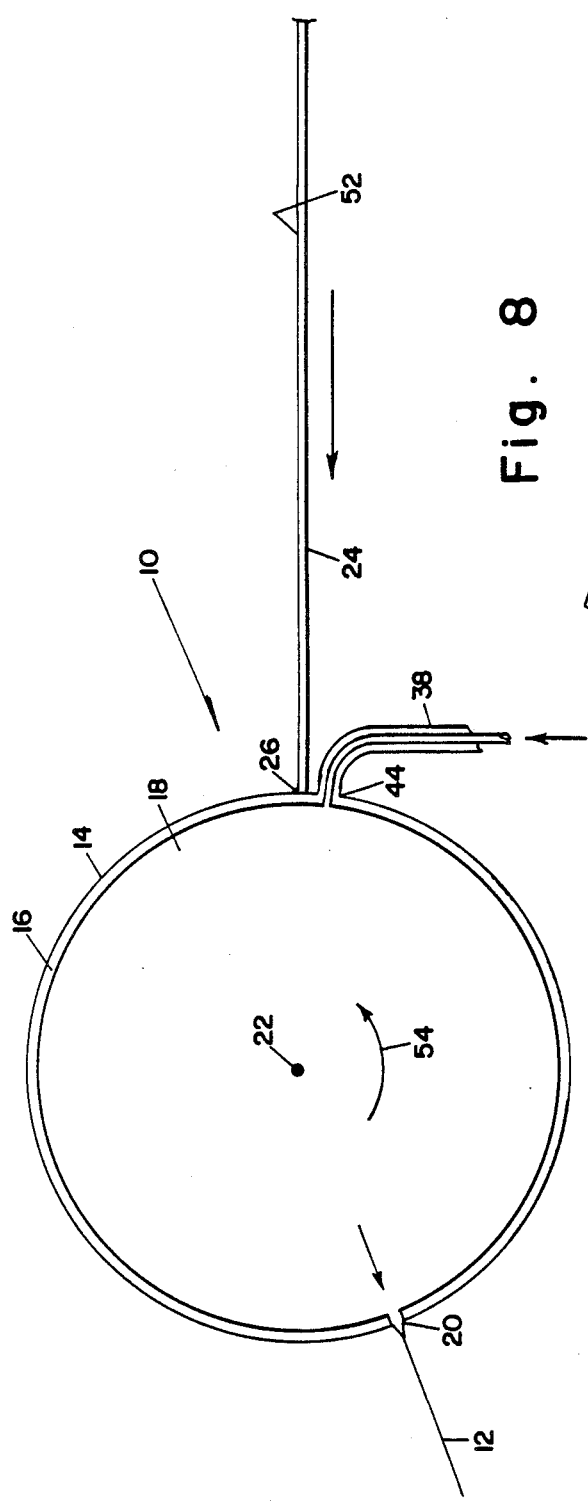
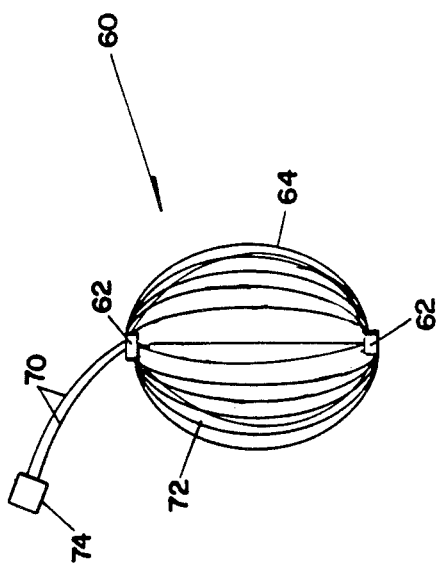
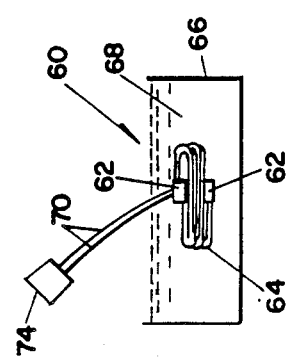

APPARATUS FOR FOAMING BUBBLES

The government has rights in this invention pursuant to U.S. Air Force Contract F04611-84-C-0055.

This invention relates generally to the fabrication of large structures. More particularly, it relates to the formation of bubbles and other thin films for fabrication of large structures especially in space and to methods and apparatus therefor.

With the increasing emphasis on space exploration, needs are developing for means for making large structures in outer space. The various requirements for making such structures may be quite different from those for building structures on the surface of the earth. For example, apparatus for making structures in outer space must be capable of being transported into orbit by means of a rocket propelled launch vehicle in compact form. However, since the resulting structures need not resist the force of the earth's gravity, heavy and elaborate bracing members that are necessary for conventional structures on earth may be unnecessary. Also, such structures need not be constructed to withstand forces of nature on earth such as atmospheric wind, water, ice, and earthquakes. However, outer space structures intended for human habitation must be built to contain an internal air pressure approximately equal to that at the surface of the earth.

For use in space, large structures on the order of hundreds of meters in diameter are envisioned. Such structures may be made from large bubbles and/or thin films or sheets which may be generated or formed from liquids such as prepolymers which are curable to form hardened structures. The bubbles may be coalesced into complex shapes before curing. When the bubbles are hardened, they may be thickened and strengthened by applying foams or other suitable materials thereto. Different shapes and combinations of shapes may be formed. For example, a mirror may be formed which has a layer of emissive material overlying the film surface. In addition, flat septa may be formed when two or more bubbles of equal size are joined together for use as wall members.

Large structures may also be constructed from bubbles or other thin films for the purposes of collecting, absorbing, and reflecting electromagnetic energy in which case the surface properties of the cured thin films may be altered by the addition to them of reflective, emissive, or absorptive materials which may be mixed with the curable liquids or later applied. For example, aluminum flakes may be applied to provide a reflective surface or aluminum may be vapor deposited at a subsequent stage. Structures may also be constructed from thin films for various other purposes in space such as enclosing large volumes for the purpose of containing fluids in the space environment.

The problems encountered in forming large bubble or other thin film structures in the space environment include the handling in vacuum of bubble forming liquids with vapor pressures greater than zero, the striking of the initial film, and the precise controlling of liquid and gas delivery to the bubble as it increases in volume by many orders of magnitude.

The forming of bubbles has conventionally involved providing an attachment surface therefor and applying a pressurized gas to the bubble film. The formation of very large bubbles may require that the initiation thereof occur on an inner surface of a toroidal object and that the attachment surface be moved to the outside of the object as the bubble gets larger and increased in size so that the bubble may remain attached.

It is, therefore, an object of an embodiment of the present invention to provide bubble forming apparatus suitable for forming very large bubbles in space wherein the line of attachment for the bubble is repositioned and increased in size as necessitated by the bubble size.

When bubbles are formed in the vacuum of space, i.e., at a pressure less than about $10^{-11}$ torr, there is a question whether even slight pressure of gas used to form the bubbles will not be adequately counterbalanced by surface tension in the bubble forming fluid so as to prevent the bubbles, once formed, from growing uncontrollably and bursting. There may thus desirably be a need for thin film forming apparatus which does not rely on pressurized gas for formation thereof.

It is, therefore, an object of another embodiment of the present invention to provide an apparatus for forming bubbles or other thin film structures which does not require pressurized gas and which is compactable to a small volume.

It is another object of the present invention to provide such apparatus which is rugged, reliable, lightweight, and non-complicated.

The above and other objects as well as features and advantages of this invention will be apparent in the following detailed description of the preferred embodiments thereof which is to be read in connection with the accompanying drawings.

IN THE DRAWINGS

FIGS. 3 to 8 are detailed partial side schematic views of the apparatus of FIG. 1 illustrating successive stages in the formation of the bubble;

FIG. 9 is a side schematic view of apparatus which embodies an alternative embodiment in compact form of the present invention; and FIG. 10 is a side view of the apparatus of FIG. 9 in expanded form.

DETAILED DESCRIPTION OF THE PREFERRED EMBODIMENTS

Figure 1:
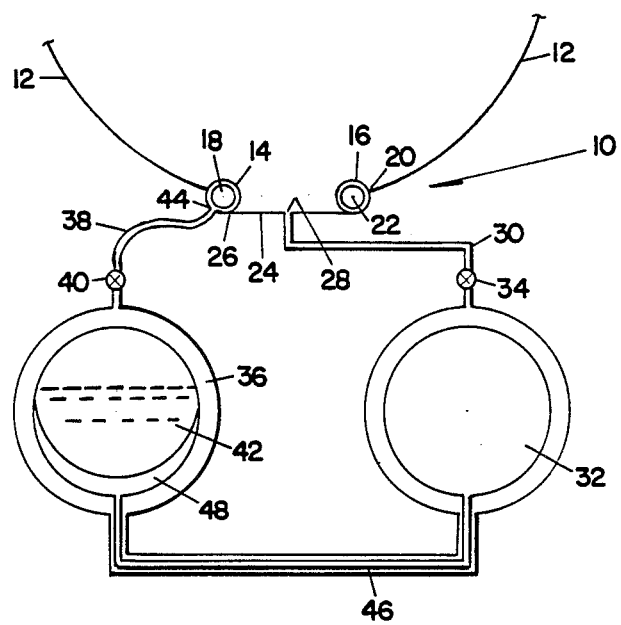
FIG. 1 is a side schematic view of an embodiment of the present invention illustrating an intermediate stage in the formation of a bubble.

Referring to FIG. 1, there is shown generally at 10 apparatus according to one embodiment of the present invention for forming a bubble illustrated at 12 of a prepolymer, i.e., a liquid which can generate a bubble and then become hardened or polymerized, or other suitable curable material. Preferably, the prepolymer may be a photocurable polymer curable upon exposure to ultraviolet illumination from the sun to take advantage of the naturally occurring energy source of the sun for curing. An example of such a photocurable prepolymer is a mixture of about 84 percent, by weight, isophorone diisocyanate polypropylene glycol monomethacrylate and about 16 percent FC430 surfactant. The surfactant is a product marketed by the Commercial Chemicals Division of Minnesota Mining and Manufacturing Company of Saint Paul, Minn.

Apparatus 10 includes an elastic hollow torus-shaped member 14 expandable both in cross section and length and having a wall 16 which encloses and defines a circular chamber illustrated at 18. Member 14 may be said to be shaped like a doughnut. The bubble 12 is shown attached to the torus 14 at a position or line illustrated at 20 which will be called hereinafter the "bubble attachment line" which is along the circumference of the torus shaped member 14 on the outer surface of the wall 16. The torus member 14 may be composed of an impervious elastomeric material which is sufficiently strong for its intended use as described hereinafter. The torus 14 includes an axis 22 which is circular and extends through the chamber 18 and about which the torus 14 may be rolled inwardly or outwardly upon itself.

An impervious membrane 24 of elastomeric material underlies the torus member 14 so as to be generally parallel to axis 22 and is attached thereto over the circumferential length of the torus 14 at a position of attachment, illustrated at 26, as described more specifically hereinafter. The membrane 24 may thus be said to extend across the space formed by the "hole in the doughnut."

Centrally of the membrane 24 is provided an aperture 28 for introduction of a pressurized gas above the membrane surface for forming a bubble 12. The aperture 28 may be formed by stretching the membrane 24 and piercing the aperture 28 therein while it is stretched so that when it is relaxed, the aperture 28 will be sealed prior to initiation of bubble formation. A suitable hose 30 is bonded or otherwise suitably affixed to the lower surface of the membrane 24 at the aperture 28 to supply pressurized gas through the aperture. Pressurized gas may be supplied by any suitable means such as gas supply vessel 32 to which hose 30 is suitably attached, and a valve 34 for regulating the gas pressure is provided in the hose 30. A preferred gas is a high molecular weight gas such as nitrogen that is nonreactive chemically with the bubble fluid and doesn't leak through the bubble 12.

Bubble forming fluid is supplied from vessel 36 through a flexible hose 38 to the torus member 14 for flowing of the fluid into the chamber 18 thereof. A valve 40 is provided in the hose line 38 for metering the flow of bubble forming fluid illustrated at 42 into the chamber 18. The fluid hose 38 is suitably attached such as by bonding to the torus 14 at position 44 which will be described in greater detail hereinafter.

Pressure for the fluid supply vessel 36 may be supplied by the pressurized gas in vessel 32 through line 46 which acts against a positive displacement bladder 48 or other suitable mechanism such as a diaphragm or piston whereby infiltration of gases into the bubble forming fluid may be prevented. However, other suitable liquid supply and gas supply means may be provided, and such means are meant to come within the scope of the present invention.

Figure 3:
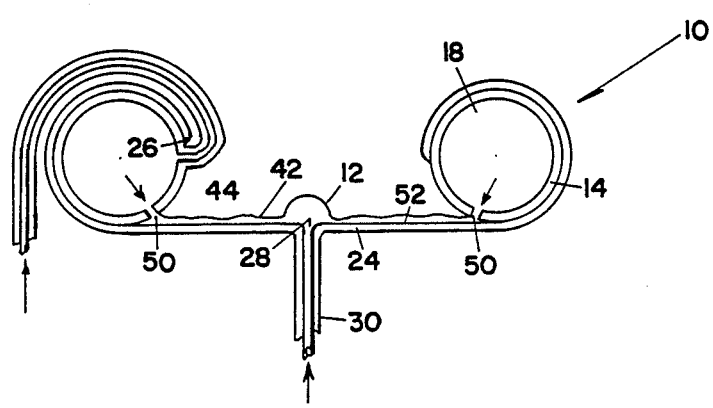

Referring to FIG. 3, there is illustrated at 50 a plurality of apertures in the torus wall 16 which are spaced apart over the length of the chamber 18 and are positioned next to the upper surface 52, i.e., the surface facing the torus 14, of the membrane 24 for discharging bubble forming fluid 42 from the torus chamber 18 onto the upper surface 52 of the membrane. The flow from the circular row of apertures 50 converges at the center of the membrane 24, i.e., at a point midway of the circular axis 22, and spreads laterally to "wet" the entire upper surface 52. After the upper surface 52 is wetted with fluid 42, the bubble 12 is initiated at the aperture 28 by providing a small amount of gas under a low pressure which in the vacuum conditions of space may be perhaps $10^{-10}$ torr through hose 30.

Figure 4:
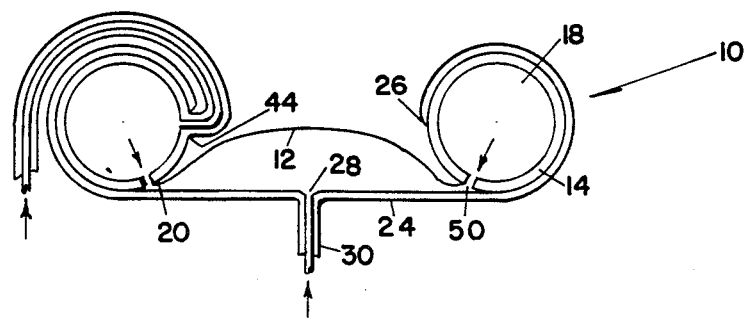
Figure 2:
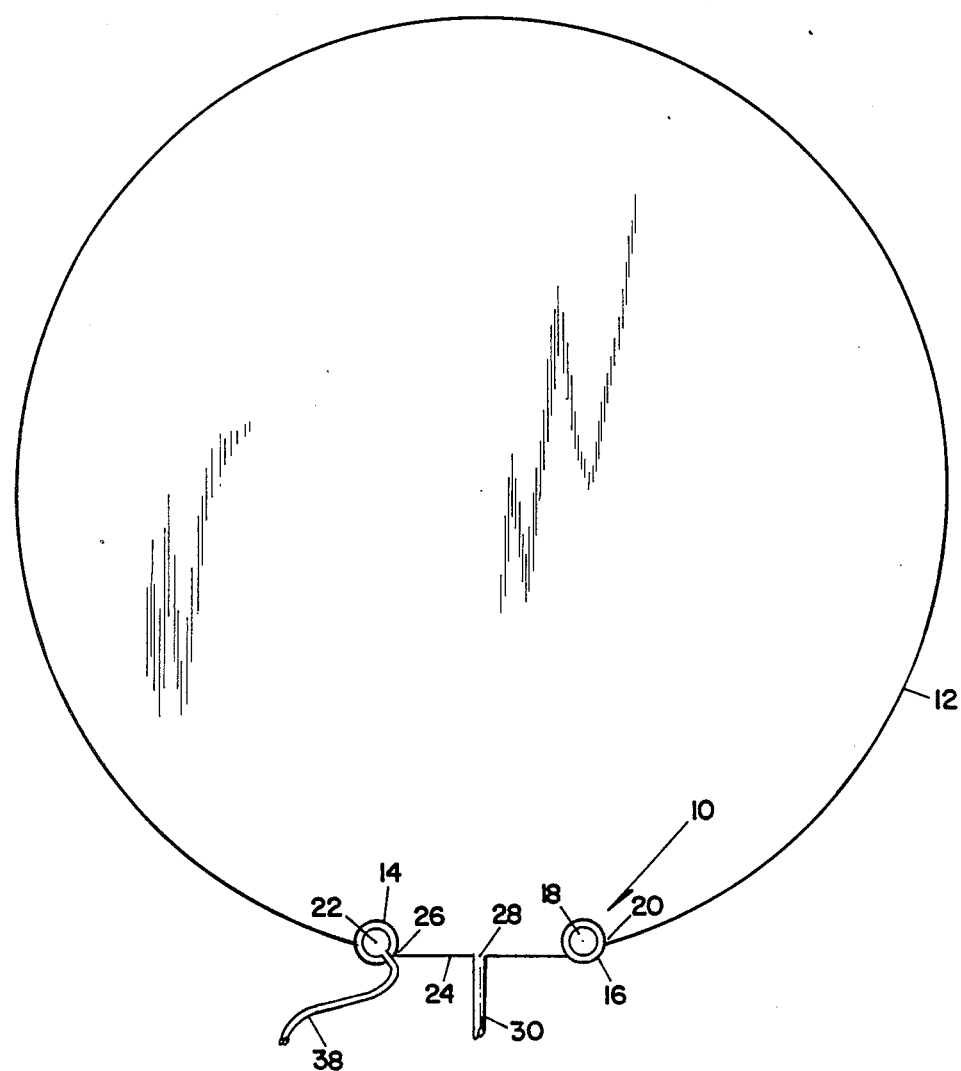
FIG. 2 is a view similar to that of FIG. 1 of a portion of the apparatus of FIG. 1 illustrating an advanced stage of formation of the bubble.

As illustrated in FIG. 4, once the initial bubble is formed, additional gas is supplied to it so that it continues to expand vertically and laterally until it touches and attaches to the torus member 14 at the bubble attachment line 20 which is adjacent the liquid feed apertures 50 which are located downwardly of the torus, i.e., near or adjacent the central portion of the membrane 24 on which the bubble is initiated, and inwardly of the circular axis 22, i.e., facing the "hole in the doughnut.".

Figure 5:
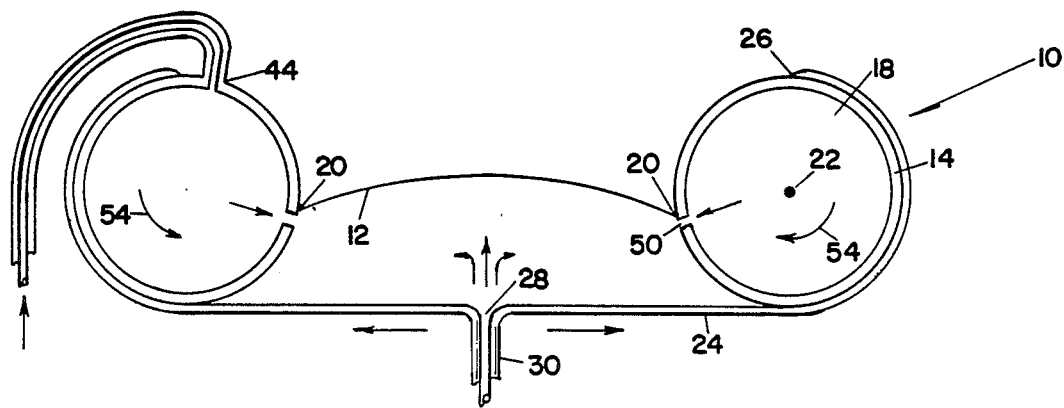

During the early bubble formation, as illustrated in FIGS. 3 to 5, the bubble attachment line 20 is generally downwardly of the torus 14 and inwardly of the circular axis 22. However, as the bubble increases in size, in order to maintain an optimal ratio of attachment diameter to bubble diameter and to maintain an appropriate bubble contact angle and to provide a pre-wetted surface for the bubble at the bubble attachment line, the bubble attachment line 20 is repositioned successively upwardly of the torus 14 and inwardly of axis 22 and then upwardly of the torus 14 and exteriorly of axis 22 and finally slightly downwardly of the torus 14 and exteriorly of axis 22, as illustrated successively in FIGS. 6 to 8. In accordance with the present invention, in order to effect movement of the bubble attachment line 20 about the chamber wall 16 circumference as the bubble 12 is increased in size, the torus member 14 is caused to roll or rotate as illustrated at 54 about its circular axis 22, i.e., it is caused to roll outwardly upon itself. This is achieved as discussed hereinafter. With the bubble attachment line 20 located as shown in FIGS. 3 and 4, the membrane 24 is tautly positioned under the torus 14 and wrapped approximately three-fourths of the way around the chamber 18 circumference to its point of attachment 26. The pressurized supply of liquid 42 to the chamber 18 provides shape to the torus 14. As the pressure of liquid 42 is increased after the bubble is attached to the torus 14, the increased pressure in the chamber 18 causes the chamber to expand so that its diameter increases and also causes the torus circumference to increase, as illustrated in FIG. 5. As the expansion of the torus 14 resultingly stretches the taut membrane 24, the tensile force on the membrane 24 causes a torsional force on the torus 14 which causes it to rotate, as illustrated at 54, about its circular axis 22 thereby causing the bubble attachment line 20 to move upwardly away from the upper surface of the membrane 24. At the same time, the gas flow is increased causing the bubble 12 to grow in size. As a consequence of torus growth, the liquid and gas supply apertures 50 and 28 respectively are enlarged to provide increased flow thereof at constant supply pressure. As the bubble 12 increases in size, the gas and liquid feed rates are accordingly increased. The flows of liquid and gas are regulated, in accordance with principles commonly known to those of ordinary skill in the art to which this invention pertains, by controlling the settings of the supply valves 40 and 34 respectively to produce a suitable relationship between torus growth and bubble growth and to reposition the bubble attachment line 20 in accordance with the bubble size. The repositioning of the bubble attachment line 20 as the bubble grows may be likened to the unfolding of a tulip.

After the torus 14 ceases rotation, as illustrated in FIG. 8, the bubble attachment line 20 is exteriorly of the circular axis 22 and slightly downwardly, and the membrane 24 may stretch as needed until the desired bubble size is achieved.

In order to prepare the torus 14 for forming a bubble, it is rotated inwardly upon itself about its axis 22 in a direction opposite to direction 54 until the membrane 24 is taut and wrapped about the torus 14 as shown in FIG. 3.

It is commonly believed that a bubble which is initiated in the vacuum of space will grow uncontrollably and burst. In order to provide stability initially to the bubble so that this will not happen, in accordance with a preferred embodiment of the present invention the bubble is initially formed under conditions in which the surrounding pressure is above about $10^{-3}$ torr in a chamber surrounding the bubble forming apparatus 10. The pressure in the chamber is then reduced to the ambient vacuum conditions of space, the chamber lid is opened exposing the bubble forming apparatus 10 to the space conditions, and the bubble is then expanded to its final size.

The supply of liquid to a bubble in accordance with the present invention may be supplemented by providing fogging apparatus for supplying a fine mist of liquid droplets.

There is illustrated in FIG. 9 and 10 an alternative embodiment of the present invention which does not require a pressurized gas for forming a bubble and which allows flexibility in forming various other shapes of thin film structures. There is illustrated generally at 60 apparatus, which in FIG. 10 is in a spherical shape but may have other suitable shapes, which comprises a pair of pole members 62 to which are anchored portions of wire, illustrated at 64, which extend generally along meridians of a globe between the pole members 62. A single wire bent to form the meridians and attached at each end to a polar member 62 may comprise the wire portions 64. Apparatus 60, in FIG. 9, is in compact shape from its shape shown in FIG. 10 which compact shape is achieved by pressing inwardly on the poles 62 and providing an opposite twist at each pole 62 thereto in a tightening manner.

At 66 is illustrated a tank 66 in which is contained bubble forming fluid 68 which may be similar to bubble forming fluid 42 for apparatus 10 of FIGS. 1 to 8.

As previously discussed, there may be difficulties in initiating bubble formation in the vacuum conditions of space with the use of a pressurized gas in that the bubble may grow uncontrollably and burst. In order to avoid the use of a pressurized gas for bubble formation in accordance with this alternative embodiment of the present invention, a bubble 72 is formed by immersing the compact wire structure 60 in the bubble forming fluid 68 and then expanding the structure 60 to the spherical shape shown in FIG. 10 with the fluid 68 clinging as a curable film between the wire portions 64. The film 68 is then cured after which additional structure may be formed thereon as previously discussed.

In order to effect expansion of apparatus 60 in accordance with this alternative embodiment of the present invention, the wire portions 64 are composed of memory metal, i.e., a material which when heated to a predetermined temperature returns to a former condition— from the compact condition of FIG. 9 to the expanded condition of FIG. 10. The wires 64 may be heated to the predetermined temperature by any suitable means such as a source of electrical energy, illustrated at 74, which supplies electrical current through electric lines illustrated at 70 which are suitably connected to suitably insulated wire portions 64 for supplying electric current thereto. The pole members 62 are preferably plastic rings to allow the wire to be suitably insulatably attached.

While any suitable memory metal may be used, a preferred memory metal is one composed of, by weight, between about 53 and 57 percent nickel and the remainder being titanium which is known as Nitinol metal, which is marketed by Special Metals Corporation of New Hartford, N.Y. In order to give "memory" to the metal, it is annealed in its preselected memory shape, i.e., the spherical shape of FIG. 10, in a furnace at a temperature of around 1100 to 1200 degrees C. and allowed to cool. The spherical shape may be provided by constructing the apparatus 60 on a spherical form wherein nails or the like are provided for guides for the wire portions 64. The transition temperature, i.e., the temperature at which the wire regains stiffness to achieve its memorized shape, may be adjusted from less than $-100$ degrees C. to more than $+100$ degrees C. by adjusting the composition in accordance with principles commonly known to those of ordinary skill in the art to which this invention pertains. A 1.0 percent change in nickel content has been determined to provide a 150 degrees C. change in transition temperature. For example, for use in space, the composition of the memory wire 64 may be adjusted to provide a transition temperature of perhaps 30 degrees C.

In order to form a bubble 72 in accordance with this alternative embodiment of the invention, the memory metal structure 60 is twisted, as previously discussed, into a compact shape as illustrated in FIG. 9 while at a temperature below the transition temperature so that it will fit within a small container 66 of bubble forming fluid 72. The compact structure 60 is then immersed in bubble forming fluid 72 and then heated by means of electric wires 70 to above the transition temperature of the wire so that the structure 60 regains its memorized shape as illustrated in FIG. 10 with a thin film 72 of bubble forming fluid between the wire portions 64 to form a bubble.

It is to be understood that the memory metal may be formed into various shapes in addition to spherical to form thin films having various corresponding shapes such as flat sheets in addition to the shape of a bubble, and such other various shapes are meant to come within the scope of the present invention.

In accordance with an alternative embodiment of the present invention, in order to utilize ambient conditions in space so that it is unnecessary to supply electrical energy to the memory metal 64 for erecting thereof, the absorptivity and emissivity of the memory metal 64 is adjusted, such as by applying mono layer coatings of material of specific color or texture, in accordance with principles commonly known to those of ordinary skill in the art to which this invention pertains, such that, when positioned in space for self-erecting, the memory metal 64 achieves an equilibrium temperature which is greater than its transition temperature due to the balance achieved between energy absorbed by the memory metal 64 from the sun and the earth and the energy radiated by the memory metal 64 to space. In accordance with this embodiment, the transition temperature is preferably chosen to be as low as possible but above the ambient temperature in its surroundings prior to deployment. In order to allow a low transition temperature, the memory metal may be cooled prior to deployment.

After the bubble 12 of FIGS. 1 to 8 or the thin film structure 72 of FIGS. 9 and 10 has been cured, a desired structure may be fabricated therefrom by applying foams or other suitable materials thereto. As previously discussed, the surface properties of the cured thin films may be altered by the addition to them of reflective, emissive, or absorptive materials which may be mixed with the curable liquids or later applied for the purposes of collecting, absorbing, or reflecting electromagnetic energy. For example, aluminum flakes may be applied to provide a reflective surface.

It is to be understood that the invention is by no means limited to the specific embodiments which have been illustrated and described herein, and that various modifications thereof may indeed be made which come within the scope of the present invention as defined by the appended claims.

What is claimed is:

1. An apparatus for forming bubbles comprising an expandable torus shaped member having a circular axis and being rollable upon itself about said circular axis whereby a bubble attachment line thereon may be repositioned from a first position inwardly of said circular axis to a second position outwardly of said circular axis, means for providing bubble forming fluid for forming a bubble attached to said bubble attachment line, means for providing pressurized gas for blowing the bubble, and an elastic membrane which extends tautly between and is wrapped about the outside of said torus shaped member and which has an edge portion which is attached to said torus shaped member to effect rolling of said torus shaped member upon itself about said circular axis to said second position with said membrane attached thereto as said torus shaped member is expanded.

2. An apparatus for forming bubbles comprising an expandable hollow torus shaped member having a wall which defines a circular chamber and having a circular axis and being rollable upon itself about said circular axis whereby a bubble attachment line thereon may be repositioned from a first position inwardly of said circular axis to a second position outwardly of said circular axis, means for providing bubble forming fluid for forming a bubble attached to said bubble attachment line, means for providing pressurized gas for blowing the bubble, an elastic membrane which extends tautly between and is wrapped about the outside of said torus shaped member and which has an edge portion which is attached to said torus shaped member to effect rolling of said torus shaped member upon itself about said circular axis to said second position with said membrane attached thereto as said torus shaped member is expanded, means for providing bubble forming fluid to said torus shaped member chamber, and aperture means in said torus shaped member wall for supplying bubble forming fluid from said chamber for forming the bubble.

3. An apparatus for forming bubbles comprising an expandable hollow torus shaped member having a wall which defines a circular chamber and having a circular axis and being rollable upon itself about said circular axis whereby a bubble attachment line thereon may be repositioned from a first position inwardly of said circular axis to a second position outwardly of said circular axis, means for providing bubble forming fluid for forming a bubble attached to said bubble attachment line, means for providing pressurized gas for blowing the bubble, wherein said torus shaped member is expandable, an elastic membrane which extends tautly between and is wrapped about the outside of said torus shaped member and which has an edge portion which is attached to said torus shaped member to effect rolling of said torus shaped member upon itself about said circular axis to said second position with said membrane attached thereto as said torus shaped member is expanded, means for providing bubble forming fluid to said torus shaped member chamber, aperture means in said torus shaped member wall for supplying bubble forming fluid from said chamber for forming the bubble, and wherein said aperture means in said wall is disposed at said bubble attachment line whereby said aperture means is repositionable from said first position to said second position as said torus shaped member is rolled upon itself about said circular axis.

4. An apparatus according to claim 3 wherein said bubble attachment line and said aperture means are repositionable successively from said first position downwardly of said torus shaped member and inwardly of said circular axis to an intermediate position upwardly of said torus shaped member and inwardly of said circular axis to another intermediate position upwardly of said torus shaped member and outwardly of said circular axis to said second position.

5. An apparatus for forming bubbles comprising an expandable hollow torus shaped member having a wall which defines a circular chamber having a circular axis and being rollable upon itself about said circular axis whereby a bubble attachment line thereon may be repositioned from a first position inwardly of said circular axis to a second position outwardly of said circular axis, means for providing bubble forming fluid for forming a bubble attached to said bubble attachment line, means for providing pressurized gas for blowing the bubble, an elastic membrane which extends tautly between and is wrapped about the outside of said torus shaped member and which has an edge portion which is attached to said torus shaped member to effect a rolling of said torus shaped member upon itself about said circular axis to said second position with said membrane attached thereto as said torus shaped member is expanded, means for providing bubble forming fluid to said torus shaped member chamber, and aperture means in said torus shaped member wall for supplying bubble forming fluid from said chamber for forming the bubble, said aperture means in said wall is disposed at said bubble attachment line whereby said aperture means is repositionable from said first position to said second position as said torus shaped member is rolled upon itself about said circular axis, and wherein said pressurized gas means comprises aperture means in said membrane and means for supplying pressurized gas to said membrane aperture means for providing of pressurized gas above the upper surface of said membrane.

* * * * *